United States Patent [19]
Williams

[11] Patent Number: 5,842,067
[45] Date of Patent: Nov. 24, 1998

[54] FILM WINDER UNIT AND CAMERA

[75] Inventor: Patricia L. Williams, Rochester, N.Y.

[73] Assignee: Eastman Kodak Company, Rochester, N.Y.

[21] Appl. No.: 897,396

[22] Filed: Jul. 21, 1997

[51] Int. Cl.⁶ ................................................ G03B 1/00
[52] U.S. Cl. .......................................... 396/411; 396/413
[58] Field of Search .................... 396/387, 411, 396/413; 242/349, 350

[56] References Cited

U.S. PATENT DOCUMENTS

| | | | |
|---|---|---|---|
| 1,317,034 | 9/1919 | Pirwitz | 396/396 |
| 1,921,559 | 8/1933 | Case | 396/411 |
| 2,140,445 | 12/1938 | Mihalyi | 396/413 |
| 2,168,998 | 8/1939 | Lindenberg | 396/411 |
| 2,674,931 | 4/1954 | Mihalyi | 396/396 |
| 2,704,969 | 3/1955 | Mische | 396/411 |
| 3,399,843 | 9/1968 | Nerwin | 242/350 |
| 3,423,041 | 1/1969 | Steisslinger et al. | 396/413 |
| 3,479,940 | 11/1969 | Nerwin | 396/413 |
| 3,868,710 | 2/1975 | Van Osch | 396/396 |
| 4,522,477 | 6/1985 | Iwashita et al. | 396/388 |
| 4,548,304 | 10/1985 | Nagata | 396/387 |
| 5,453,808 | 9/1995 | Zawodny et al. | 396/387 |
| 5,568,214 | 10/1996 | Stiehler | 396/411 |
| 5,628,040 | 5/1997 | Lee | 396/396 |

FOREIGN PATENT DOCUMENTS

499544   1/1939   United Kingdom .

Primary Examiner—Eddie C. Lee
Attorney, Agent, or Firm—Robert Luke Walker

[57] ABSTRACT

A film winder and camera. The film winder has a film transport adapted to move film in two opposed directions in response to rotational inputs in forward and reverse directions. An output unit mechanically engages the film transport. The output unit defines an axis of rotation. An outer winder is coaxial with the output unit. The outer winder is rotatable about the axis in first and second directions of rotation relative to the body. An inner winder is nested in the outer winder. The inner winder is coaxial with the output unit. The inner winder is rotatable about the axis in the first and second directions of rotation independent of the outer winder. Outer and inner clutches are disposed between respective winders and the output unit. The outer clutch couples the outer winder to the output unit during rotation of the outer winder relative to the body in the first direction of rotation. The outer clutch decouples the outer winder from the output unit during rotation of the outer winder relative to the body in the second direction of rotation. The inner clutch couples the inner winder to the output unit during rotation of the inner winder in the second direction of rotation. The inner clutch decouples the inner winder from the output unit during rotation of the inner winder in the first direction of rotation.

25 Claims, 9 Drawing Sheets

FILM WINDER UNIT AND CAMERA

CROSS REFERENCE TO RELATED APPLICATIONS

Reference is made to commonly assigned co-pending U.S. patent application Ser. No. 08/874,841, entitled: CAMERA AND METHOD FOR TRANSPORTING FILM IN A CAMERA, and filed in the names of Robert Stanchus and Timothy Fuss; and U.S. patent application Ser. No. 08/874,901, entitled: CAMERA AND ADVANCE-REWIND UNIT, and filed in the name of Patricia Williams.

FIELD OF THE INVENTION

The invention relates to photography and more particularly relates to a film winder for advancing and rewinding photographic film and to a camera.

BACKGROUND OF THE INVENTION

In many still photographic film cameras, film is loaded as a scroll within a canister or magazine. The film is advanced from one chamber to another within the camera and is later rewound back into the magazine. Film exposure is provided either on film advance or on rewind. There is a continuing trend toward smaller full-featured cameras. Such cameras can be problematic with controls and user accessible features crowded together into the smaller available space. The small available space is particularly troublesome for a film advance lever or thumbwheel, since it is highly preferred that a person be able to advance the film without moving one or both hands from a position suitable for holding the camera while shooting film. Similarly, small available space may interfere with a users ability to rotate a rewind knob through a full circle without running into other camera components.

U.S. Pat. No. 1,921,559 discloses a camera in which a knob attached to a spool in a film magazine is turned one direction to thrust film into an empty chamber and is turned in another direction to rewind the film into the magazine. U.S. Pat. No. 3,868,710 discloses a similar camera in which both the film magazine and the supply chamber lack spools.

U.S. Pat. No. 2,674,931 discloses a camera in which a knob connected to a film spool is moved to one axial position to prewind a roll of film into an empty chamber. The shaft is then moved to another axial position to engage a one-way clutch that, in association with a metering mechanism, only permits the knob to turn in the opposite direction, winding the film.

U.S. Pat. No. 2,704,969 discloses a camera in which an objective/range finder knob is coaxial with a film winding knob. The objective/range finder knob pivots about an arc within a fixed mount concentric with the larger film winding knob.

U.S. Pat. No. 3,423,041 discloses a camera in which a single operating lever (moved in one direction of rotation) advances and rewinds film. A two position drive mechanism is switched to change the direction of rotation.

U.S. Pat. No. 3,399,843 discloses a camera in which a shaft is movable between a first position engaging a take-up spool for winding film from a magazine and a second position engaging a gear train connected to the magazine spool for rewinding back into the magazine. The same knob is used in both cases. Engagement and disengagement of the take-up spool is provided by a positive clutch. Engagement and disengagement of the gear train is provided by movement of a gear fixed to the shaft. A ratchet and pawl mechanism limits movement of the shaft to a single direction of rotation. U.S. Pat. No. 3,479,940 discloses a similar camera providing automatic film advancing and rewinding.

U.S. Pat. No. 2,140,445 discloses a camera having film advance and rewinding clutches, which are connected to respective film spools and separate film winding and rewinding mechanisms, alternately by a pivoting lever. The rewinding mechanism has a knob that rotates in axial alignment with one of the film spools. The film winding mechanism has a film advance lever which rotates about an axis disposed at 90 degrees to the axes of film chambers.

U.S. Pat. No. 5,568,214 discloses a camera having a clutch between a take-up spool and a drive gear.

U.S. Pat. No. 2,168,998 discloses a camera having a film-winding mechanism including a ratchet and pawl. A winding knob is rotated to advance the film. The pawl can be moved out of engagement with the ratchet for rewinding using a separate rewinding knob. U.S. Pat. No. 1,317,034 and Great Britain Patent No. 499,544 also disclose cameras having film winding mechanisms having ratchets and pawls.

U.S. Pat. No. 4,522,477 discloses a camera having a motorized winder/rewinder having separate coaxial one-way clutches for film advancing and rewinding. A manual wind lever is also coaxial and includes an additional one-way clutch.

U.S. Pat. No. 4,548,304 discloses a one-way over-running clutch and a camera having a pair of such clutches, arranged to operate in opposite directions of rotation, for film advancing and rewinding using a reversible motor.

It is thus desirable that a camera and film winder be provided that reduces the space necessary for manual operation of film advance and rewind and allows use of both advance and rewind where 360 degrees of clearance is unavailable. It is also desirable that a camera and film winder be provided that also allow silent operation.

SUMMARY OF THE INVENTION

The invention is defined by the claims. The invention, in its broader aspects, provides a film winder and camera. The film winder has a film transport adapted to move film in two opposed directions in response to rotational inputs in forward and reverse directions. An output unit mechanically engages the film transport. The output unit defines an axis of rotation. An outer winder is coaxial with the output unit. The outer winder is rotatable about the axis in first and second directions of rotation relative to the body. An inner winder is nested in the outer winder. The inner winder is coaxial with the output unit. The inner winder is rotatable about the axis in the first and second directions of rotation independent of the outer winder. Outer and inner clutches are disposed between respective winders and the output unit. The outer clutch couples the outer winder to the output unit during rotation of the outer winder relative to the body in the first direction of rotation. The outer clutch decouples the outer winder from the output unit during rotation of the outer winder relative to the body in the second direction of rotation. The inner clutch couples the inner winder to the output unit during rotation of the inner winder in the second direction of rotation. The inner clutch decouples the inner winder from the output unit during rotation of the inner winder in the first direction of rotation.

It is an advantageous effect of embodiments of the invention that a camera and film winder are provided that reduce the space necessary for manual operation of film advance and rewind and allows use of both advance and rewind where 360 degrees of clearance is unavailable. It is also an advantageous effect of embodiments of the invention that a camera and film winder are provided that also allow silent operation.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Referring particularly to FIGS. 1 and 8–11, the apparatus of the invention advances and rewinds film between two different sites. The term "film" is used herein to refer to a narrow strip or web of thin, flexible material. The invention is particularly useful in relation to cameras that use photographic filmstrips and advance and rewind the filmstrip manually, and is generally discussed below in terms of such apparatus. It will be understood, however, that the invention is not limited to cameras or to the embodiments discussed and that considerations similar to those discussed herein are applicable to other embodiments of the apparatus of the invention. Examples of other apparatus of the invention include, bulk-roll-to-cartridge loaders, filmstrip projectors, and filmstrip viewers.

The camera or other apparatus 10 has a body 12 which includes a pair of film chambers 14,16. The body 12 defines first and second film spaces 18,20 in respective film chambers 14,16, and a film path, including an intermediate frame 22, between the chambers 14,16. The film spaces 18,20 are cylindrical and each has a film space axis 24. The axes 24 are substantially parallel. The film spaces 18,20 accommodate the film as a roll or coil around a spool or an empty core. The film roll in one of the chambers 14,16, or both, can be within a film cassette. A film transport 26 is disposed in the body 12 in operative relation to the film path 22. The film transport 26 is adapted to move film in two opposed directions in response to rotational inputs in forward and reverse directions. The film winder unit 28 of the invention is in engagement with the film transport 26.

Specific details of the film transport 26 can vary. A great many different film transports are well known to those of skill in the art. For example, the film transport 26 can include a gear train or cogbelts and cogwheels, or a combination of such features.

Referring to FIGS. 8–11, in particular embodiments of the invention, chamber 14 is configured to receive a cartridge 29. The film transport 26 includes a gear train 23 and a spindle 25 that engages the spool 27 of the cartridge 29. The spindle 25 is fixed to one of the gears of the gear train 23. The gear train 23 is also fixed to another spool 31 that is disposed in the other film chamber 16.

The film transport 26 can include a metering mechanism (not separately illustrated) that repeatedly meters the film during advancing to hold segments of film in the intermediate frame 22, for exposure or other use, and limits film advance to one frame per actuation of a shutter mechanism or the like. The specifics of the metering mechanism are not critical and many metering mechanisms are well-known to those of skill in the art. Many metering mechanisms meter against the perforations, in other words, the metering mechanism includes an engagement element 33 that grips the perforations to align a film segment with the intermediate frame. Examples of such elements include rotating sprockets and linearly and/or pivotably movable pawl or sprag mechanisms.

The film transport can include any of a wide variety of additional features (not shown) that add to the convenience of using the camera. The film transport can include an anti-backup (not separately illustrated). The anti-backup can prevent rewinding unless the end of the film is reached or unless a deliberate action is taken by the camera operator. The film transport can include a door lock that precludes access to the film magazine unless the film has been rewound into the magazine and, for example, with APS film, can include a member for opening the film door of the APS magazine. The apparatus of the invention is not limited to a particular photographic film format or type.

The film winder unit 28 has a central axis 30 and is disc-shaped or mostly disc-shaped. The film winder unit 28 has an output unit 32, outer and inner winders 34,36, and outer and inner clutches 38,40 disposed between respective winders 34,36 and the output unit 32. The outer and inner clutches 38,40 differ in size and handedness.

The output unit 32 mechanically engages the film transport 26. In the embodiments shown in the figures, the output unit 32 has gear teeth 41 meshed with a gear of the film transport gear train 23; however, the invention is not limited to this kind of mechanical engagement. For example, the film transport 26 and output unit 32 could be connected by sprockets and chains or by belts and pulleys. The output unit 32 rotates about the axis of rotation 30 in first and second directions of rotation, indicated by arrows 42 and 44, respectively. The first direction of rotation is treated herein as providing film advance and forward rotation of a film spool 27 and the second direction of rotation is treated herein as providing film rewind and a reverse direction of rotation of a film spool 27 or the like. This is a matter of convenience. The film transport 26 could instead advance and rewind in the opposite directions. Similarly, the film transport 26 can "advance" film out of a film cartridge 29 or can "advance" prewound film back into a film cartridge 29.

Figure 4:
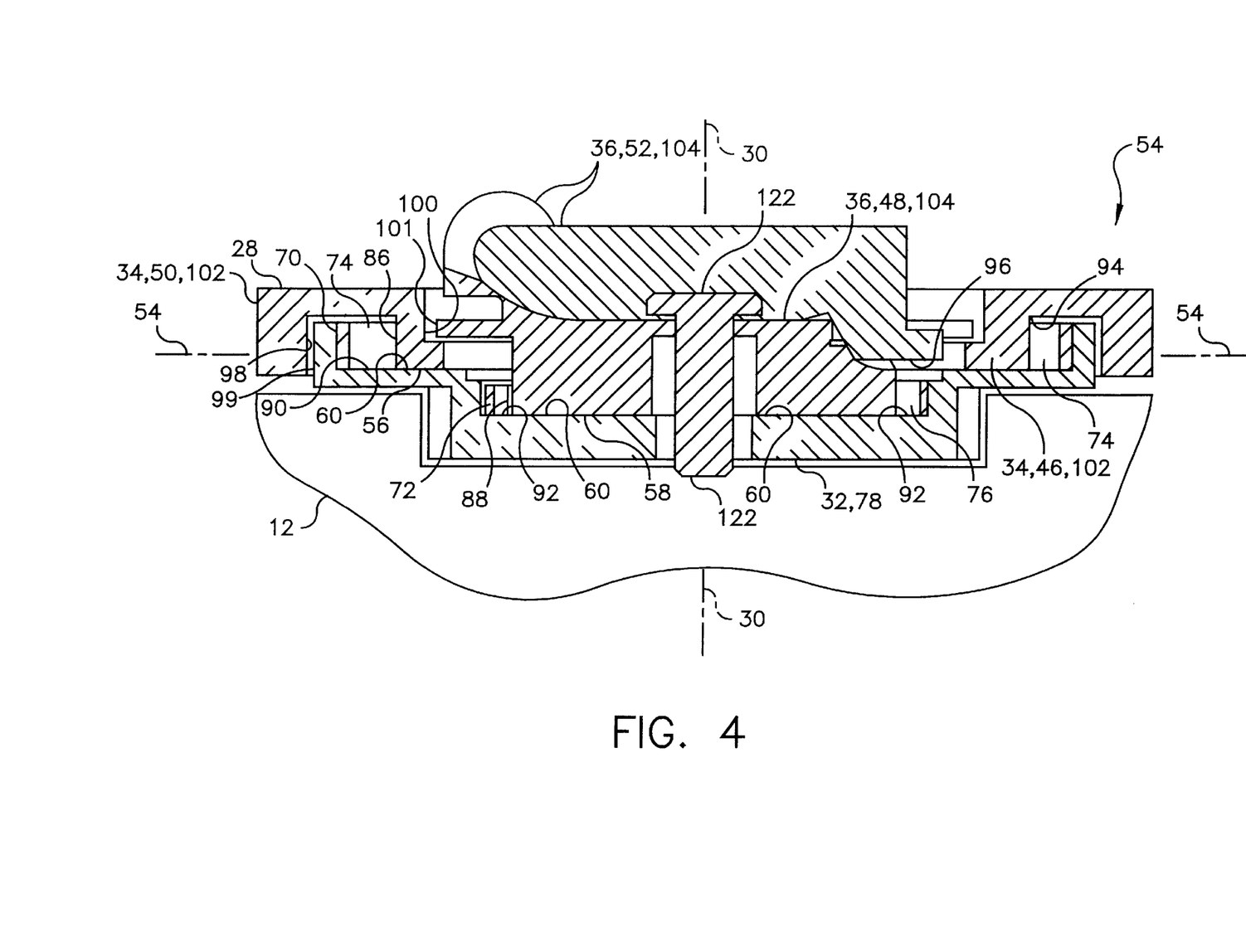
FIG. 4 is a cross-sectional view of the film winder of another embodiment of the apparatus of the invention. The direction of this view is perpendicular to the direction of the view of FIG. 3.

The winders 34,36 are coaxial with the output unit 32 and can each rotate independent of the other winder 36,34, respectively, in both the first and second directions of rotation relative to the body 12. The winders 34,36 each have a base 46,48, respectively, and a grip portion 50,52, respectively, for manipulation by the user. The inner winder 36 has a base 48 that is smaller than and nested within the outer winder 34, or nested within both the outer winder 34 and the output unit 32. It is preferred for compactness, that the output unit 32 and winders 34,36 are aligned along the axis 30 such that at least one geometric plane perpendicular to the axis extends through the output unit 32, the outer winder 34, and the inner winder 36. (An example of such a plane is shown by dashed line 54 in FIG. 4.) In the embodiments shown in the figures, the bases of the outer and inner winders 34,36 are supported by the output unit 32 and are each contiguous with the output unit 32 along complementary shaped contact surfaces 56,60 and 58,60, respectively.

The grip portion 50,52 of each winder 36,38 can rotate in a full circle. The film winder unit 28 is mounted on the body 12 such that each grip portion 50,52 is at least partially accessible, that is, each grip portion 50,52 can be held and manipulated by the user to pivot the respective winder 36,38 through at least part of a circle in a single stroke or manipulation.

The grip portions 50,52 can be configured in a variety of ways for convenience and ease of movement. For example, the grip portion 50,52 of the outer winder 34 can be configured as a knurled thumbwheel. The grip portion 52 of the inner winder 36 can be configured as a folding crank, as shown in the figures. The crank can be pivotable relative to the base 48 between a use position in which the crank extends outward from the base and a stored position in which the handle is at least partially recessed within the base.

The clutches 38,40 couple the winders 34,36 to the output unit 32, in alternation. The outer clutch 38 couples the outer winder 34 to the output unit 32 during rotation of the outer winder 34 relative to the body 12 in the first direction of rotation. The outer clutch 38 decouples the outer winder 34 from the output unit 32 during rotation of the outer winder 34 relative to the body 12 in the second direction of rotation. The inner clutch 40 couples the inner winder 36 to the output unit 32 during rotation of the inner winder 36 relative to the body 12 in the second direction of rotation. The inner clutch 40 decouples the inner winder 36 from the output unit 32 during rotation of the inner winder 36 relative to the body 12 in the first direction of rotation. For convenience, the direction of rotation of a winder 34,36 when that winder 34,36 is coupled to the output unit 32 is referred to herein as a "coupled direction of rotation". The opposite direction of rotation, for that winder 34,36 is referred to herein as an "uncoupled direction of rotation".

Each clutch 38,40 is capable of ratcheting; that is, each clutch 38,40 can rotate the output unit 32 through complete circles by back and forth strokes of a winder 34,36 through a stroke angle of less than 360 degrees. This allows mounting of the film winder unit 28 on the body 12 in a configuration, like that shown in FIGS. 10–11, in which it is inconvenient or impossible to rotate the inner and outer winders 34,36 in a full circle about the axis of rotation.

In the embodiment of the invention shown in the figures, the clutches 38,40 each comprise a ratchet 62,64, a lug 66,68, and a loose pawl 70,72; all respectively. The ratchet 62,64 and lug 66,68 face each other across a race 74,76; all respectively. The pawl 70 is trapped within the race 74 and the pawl 72 within the race 76.

The inner and outer ratchets 62,64 are annular and concentric and the inner ratchet 64 is smaller in diameter than the outer ratchet 62. The ratchets 62,64 are each fixed to the output unit 32. The ratchets 62,64 and output unit 32 are referred to collectively herein as the drive member 78. The ratchets 62,64 are preferably continuous with the output unit 32 and are parts of a single plastic casting or the like. Each ratchet 62,64 has at least one engagement port 80 for engagement with the respective pawl 70,72. The number of engagement ports 80 is determined by a desired minimum ratchet step size, that is, minimum angle of rotation required for one stroke of that winder 34,36. If the rotation of the winder 34,36 is obstructed, then the minimum ratchet step must be equal to or less the greatest angle of rotation permitted by obstructions. The ratchet step size should reflect a natural motion of the user in operating the winder 34,36. For example, a crank type inner winder pivotable through 210 degrees can conveniently have two engagement ports 80 spaced by 180 degrees, or some larger number of engagement ports 80. The angular spacing between engagement ports 80 is not critical; however, it is likely that a user would find the resulting unequal stroke lengths uncomfortable. The engagement ports 80 each have a ramp 82 that is angled obliquely outward from the respective race 74,76 and an abutment 84 at the outer end of the ramp 82. The abutment 84, in the embodiment shown in the figures is substantially normal to the axis of rotation 30.

Opposite each ratchet 62,64 is a boundary surface 86,88 of a respective winder 34,36. Extending between the outer ratchet 62 and boundary surface 86 is a raceway surface 90. The outer ratchet 62, outer raceway surface 90, and outer boundary surface 86 together define the outer race 74. Extending between the ratchet 64 and boundary surface 88 is a raceway surface 92. The inner ratchet 64, inner raceway surface 92, and inner boundary surface 88 together define the inner race 76. The two races 74,76 are coaxial with each other and the axis 30. Cover surfaces 94,96 overlie respective races 74,76. The raceway surfaces 90,92 and cover surfaces 94,96 protect respective pawls 70,72 against intrusion of foreign objects and displacement and can be configured to restrict axial travel of the pawls 70,72 relative to the respective ratchets 62,64. The boundary surfaces 86,88, raceway surfaces 90,92, and cover surfaces 94,96 are smooth or are otherwise configured so as to not interfere with movement of the pawls 70,72. In the embodiment shown in the figures, interference with movement of the pawls 70,72 due to tilting of the winders 34,36 and drive member 78 relative to the axis 30 is deterred by adjoining circumferential surfaces 98,99 of the outer winder 34 and drive member 78 and circumferential surfaces 100,101 of the outer and inner winders 34,36.

The lugs 66,68 extend radially outward from the boundary surfaces 86,88 of each winder 34,36, respectively, within respective races 74,76. The lugs 66,68 are each fixed to a respective winder 34,36 and are also preferably continuous with the respective winder 34,36 and are parts of a single plastic casting or the like. The winders 34,36 and attached lugs 66,68 are each referred to collectively herein as outer and inner winding members 102,104, respectively. The lugs 66,68 are each disposed in a respective race 74,76 to engage a respective pawl 70,72. Each lug 66,68 has opposed first and second faces 106,108. The first face 106 engages an abutment 84 of the ratchet 62,64 when that winding member 102,104 is moved in a coupled direction of rotation.

The pawls 70,72 are each unattached to the drive member 78 and winding members 102,104, but are trapped within respective races 74,76. The outer pawl 70 drives the outer ratchet 62 when the outer winder 34 is rotated in the first direction. The outer pawl 70 rotates relative to the outer ratchet 62 when the outer winder 34 is rotated in the second direction. The inner pawl 72 drives the inner ratchet 64 when the inner winder 36 is rotated in the second direction. The inner pawl 72 rotates relative to the inner ratchet 64 when the inner winder 36 is rotated in the first direction.

The pawls 70,72 each have a head 110 disposed to engage the respective ratchet 62,64 and a tail 112 disposed to engage the respective lug 66,68. The pawls 70,72 each have a main portion 114 between the head 110 and tail 112. The head 110 is biased toward the ratchet 62,64 and is deflectable into the recess defined by each engagement port 80 of the respective ratchet 62,64 when the ratchet 62,64 and pawl 70,72 are appropriately aligned. It is preferred that the head 110 be complementary in shape to the abutments 84 of the respective ratchet 62,64 to deter slippage. The tail 112 has opposed first and second faces 116,118. The first face 116 engages the first face 106 of the respective lug 66,68 when rotation of the winding member 102,104 is in the coupled direction. The shapes of the tail faces 116,118 can be adapted to match the shapes of lug faces 106,108.

Figure 1:
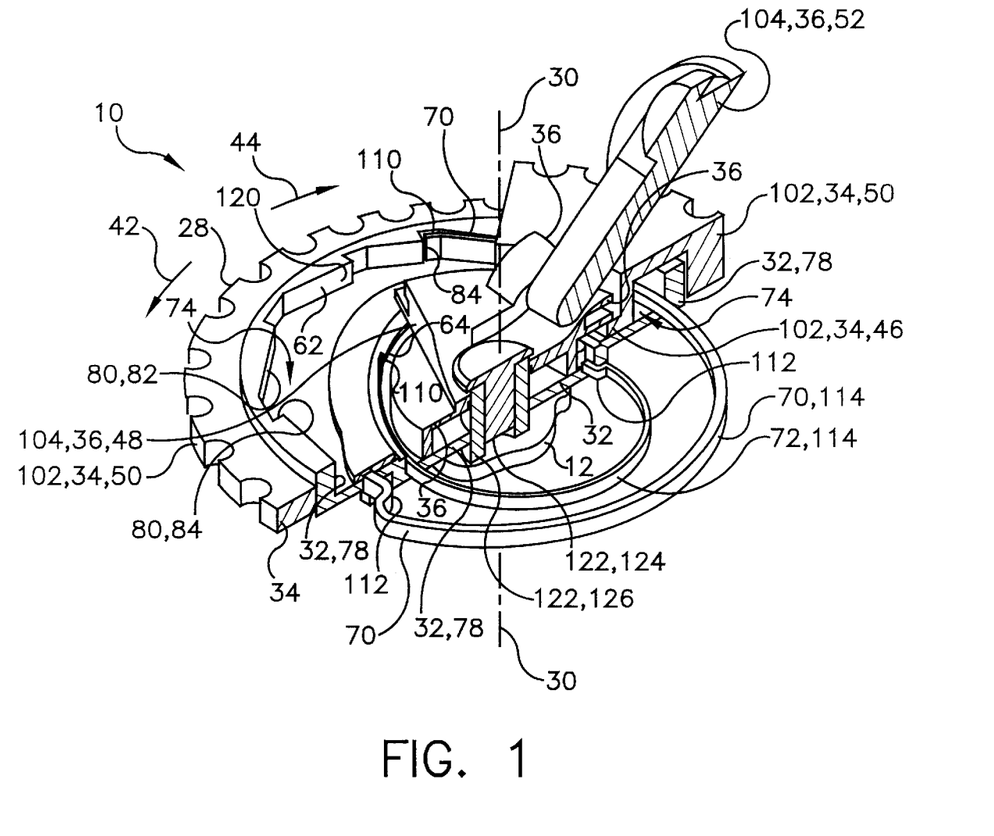
FIG. 1 is a partially cut-away perspective view of an embodiment of the improved apparatus for film winding.
Figure 2:
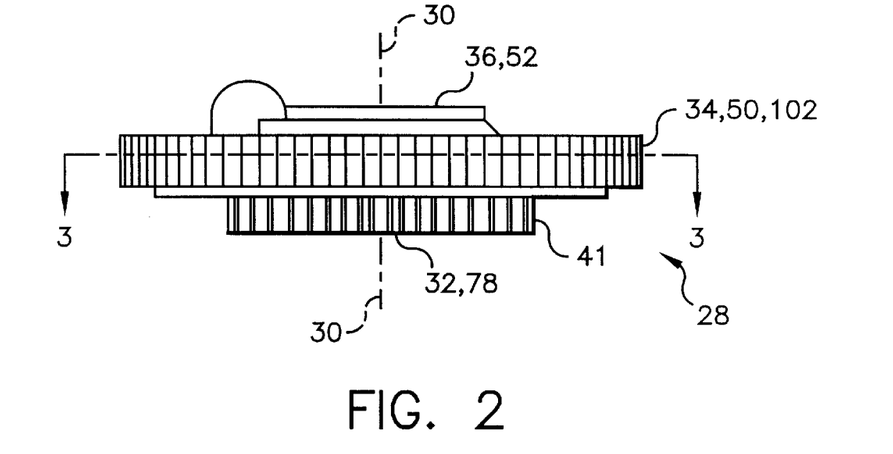
FIG. 2 is a side plan view of the film winder of the apparatus of FIG. 1.
Figure 3:
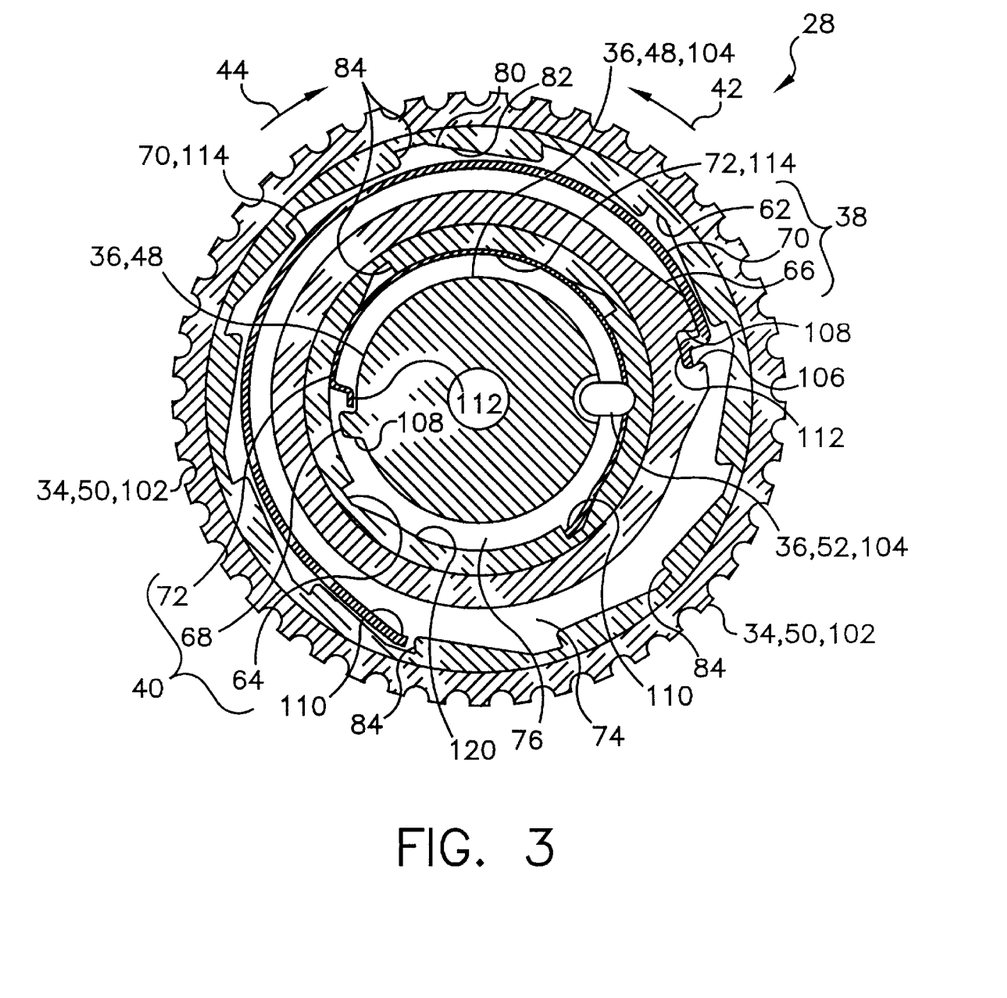
FIG. 3 is a cross-sectional view of the film winder of FIG. 2, taken substantially along line 3—3 of FIG. 2.
Figure 5:
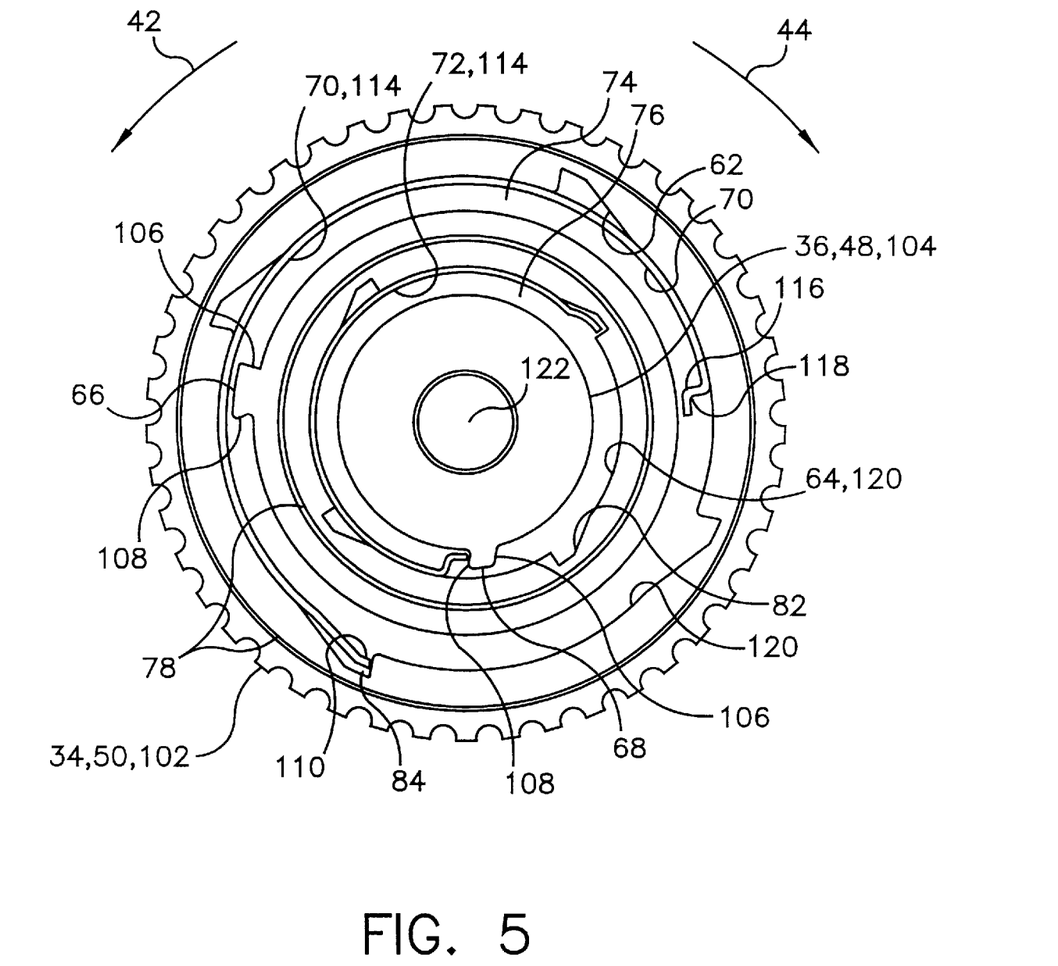
FIG. 5 is the same view as in FIG. 3 of the film winder of still another embodiment of the improved apparatus.
Figure 6:
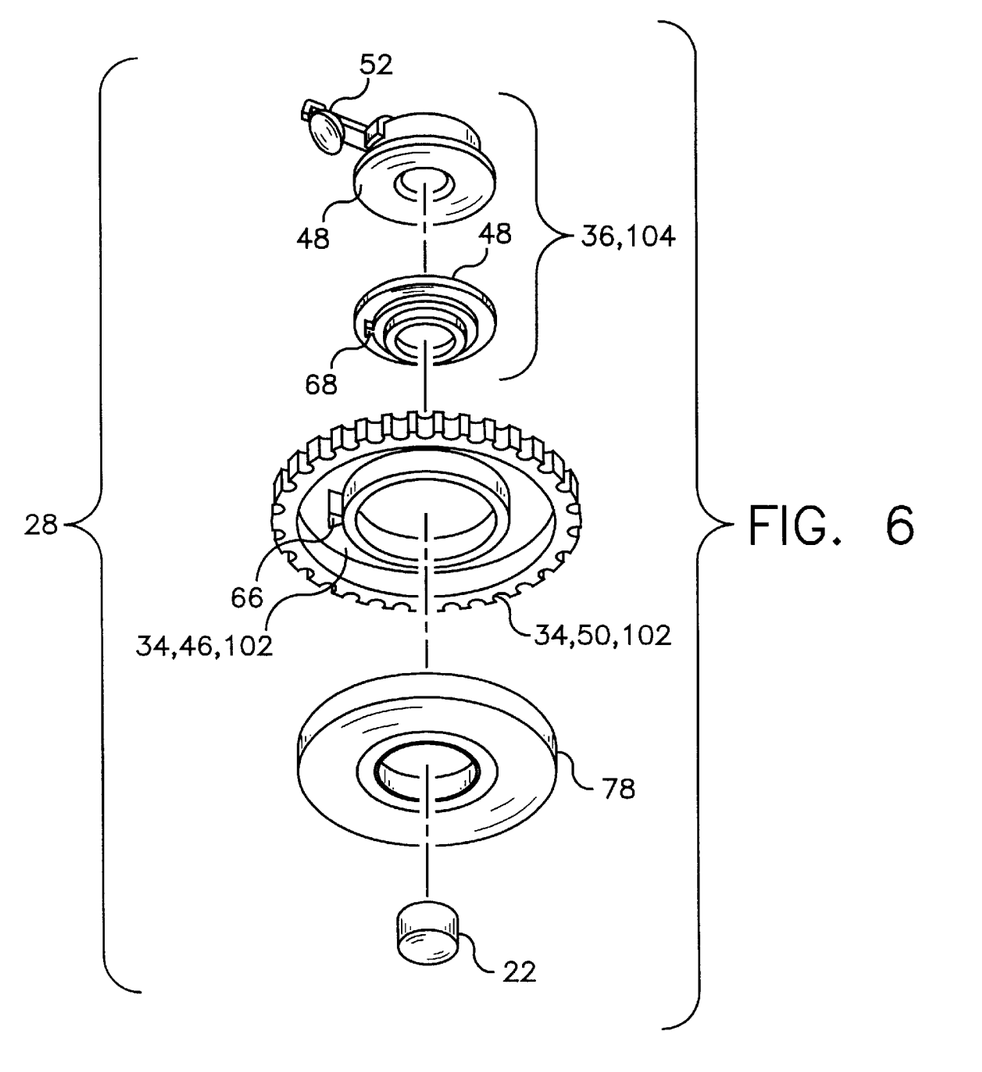
FIG. 6 is a lower perspective view of the film winder of FIG. 5.
Figure 7:
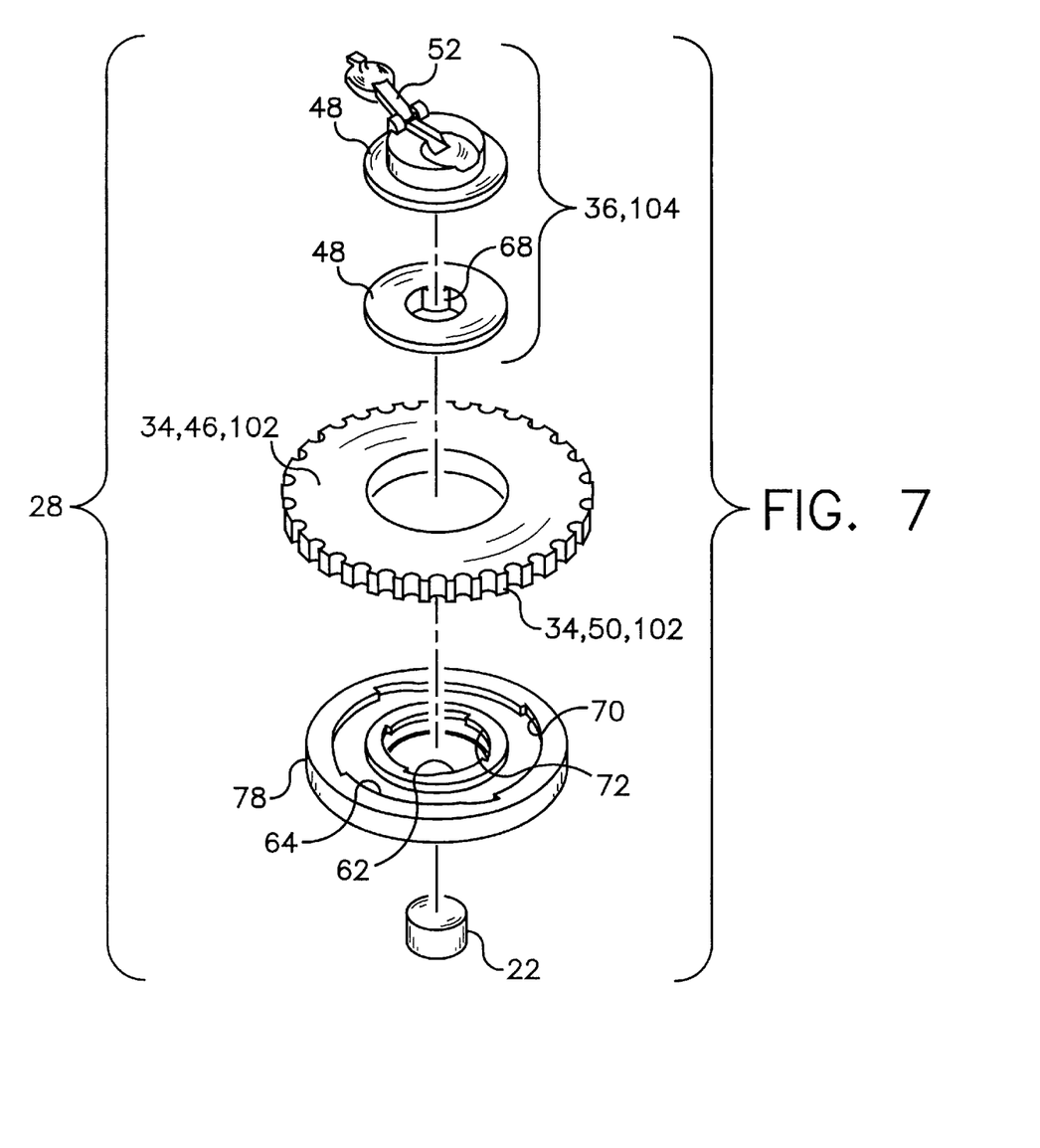
FIG. 7 is an upper perspective view of the film winder of FIG. 5.
Figure 8:
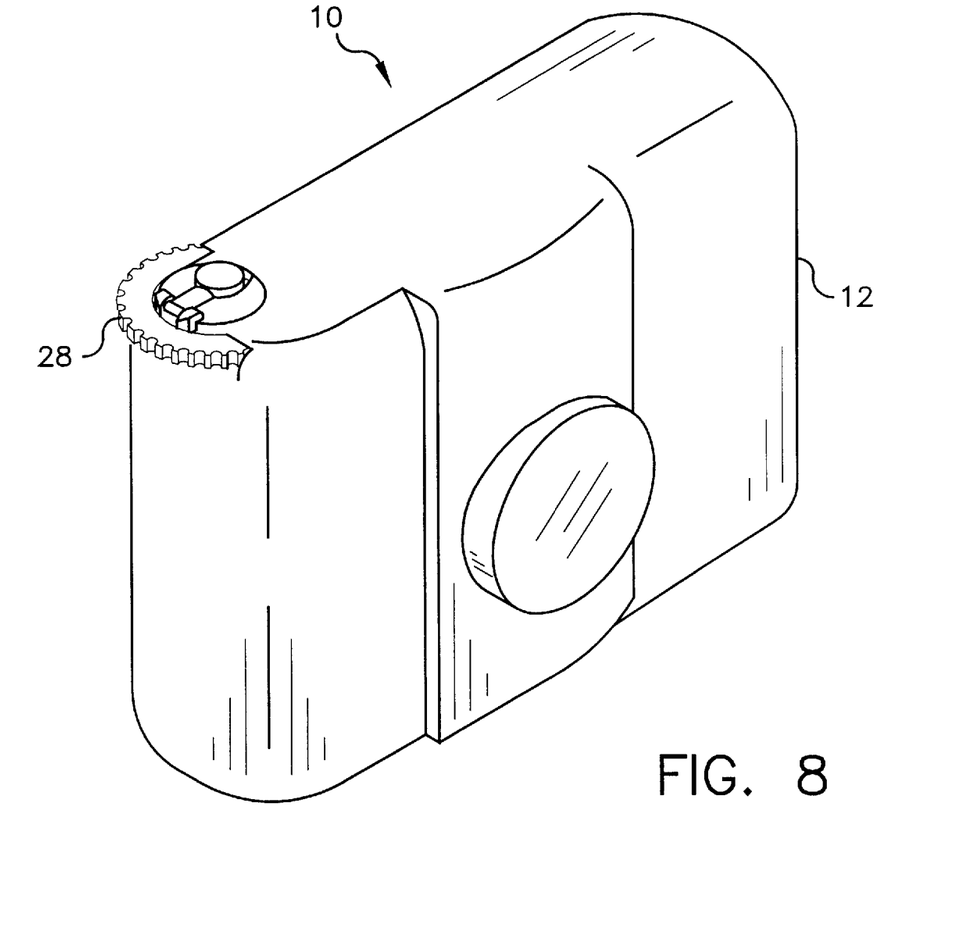
FIG. 8 is a front perspective view of an embodiment of the camera of the invention.
Figure 9:
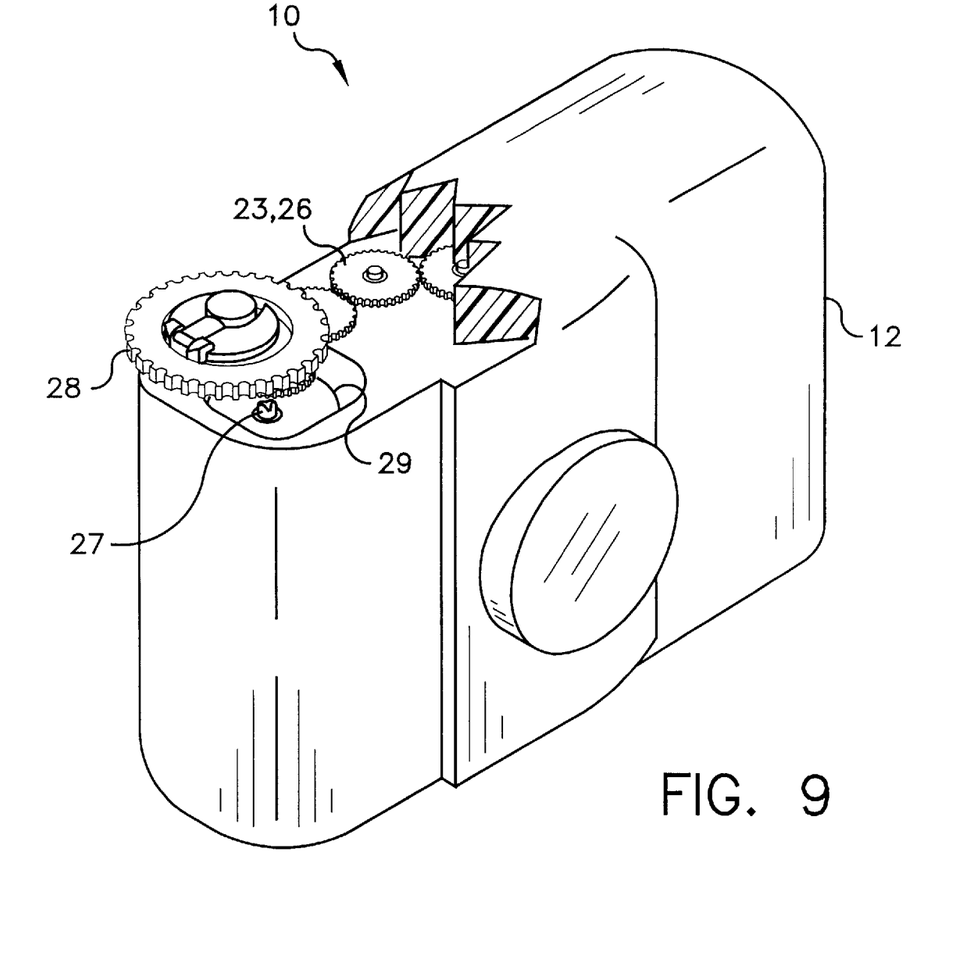
FIG. 9 is a partially cut-away front perspective view of the camera of FIG. 8.
Figure 10:
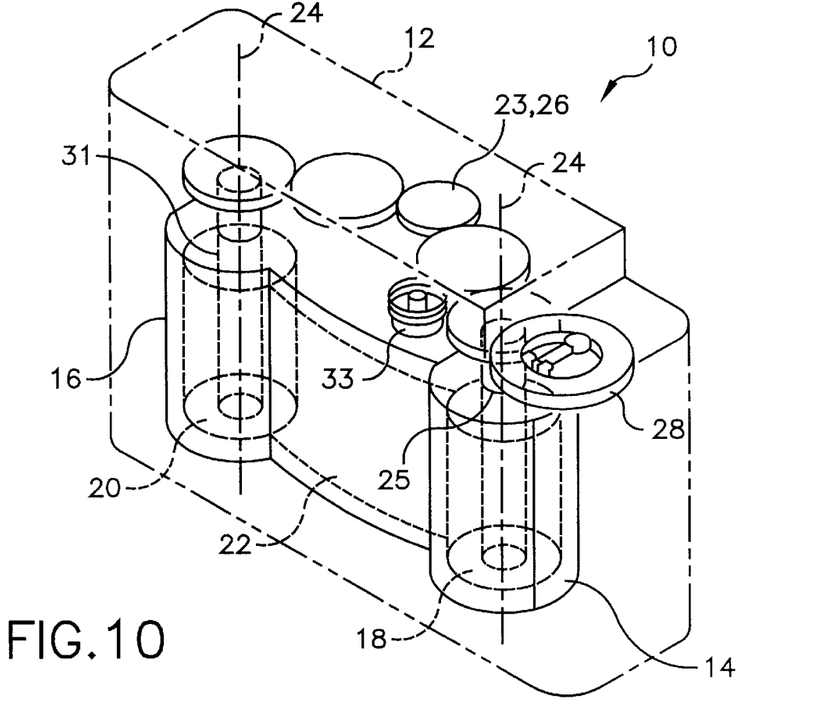
FIG. 10 is a semi-diagrammatical front perspective view of another embodiment of the improved camera.
Figure 11:
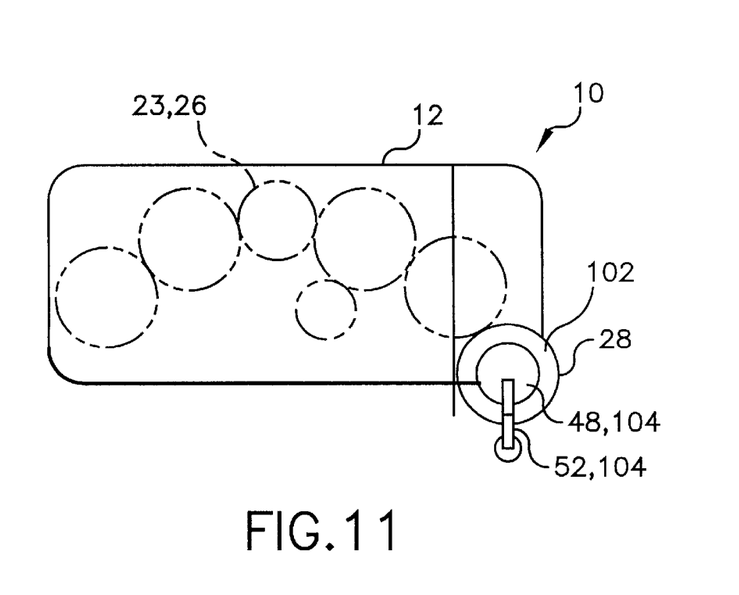
FIG. 11 is a semi-diagrammatical top view of the camera of FIG. 10.

In the embodiments shown in the figures, each pawl tail 112 is a bent portion of a continuous band. The tails 112 are each bent in a roughly S-shape and have a trailing end that extends in a rearward direction. The lug faces 106,108 are roughly complementary in shape to respective faces 116,118 of the pawl 70,72. In the embodiment of FIG. 5, the first face 106 of each lug 66,68 has a nose that protrudes radially outward and toward the coupled direction of rotation. The second face 108 is flattened and substantially radial to the axis of rotation 30. In the embodiment shown in FIG. 3, the inner lug 68 has a second face 108 that is more rounded. When a winding member 34 or 36 is rotated in the decoupled direction of rotation, the second face 108 of the lug 68 contacts the second face 118 of the respective pawl 70 or 72. The pawl 70,72 can then rotate with the winding member 102,104 relative to the driving member 78; or the tail 112 of the respective pawl 70,72 can flex allowing the lug 66,68 to pass to the inside of the trailing portion of the pawl 70,72. This can reduce the risk of damage to the winding assembly if a winder 34,36 is turned with excessive force and speed. The second face 106 of the tails 112 and the second face 116 of the lugs 66,68 can be shaped to adjust the amount of force required to flex the respective tail 112 and permit the lug 66,68 to pass. The outer lug 66 of the film winder unit 28 of FIG. 3 has the shape of a notched revetment. This lug 66 functions in the same manner as the inner lug 68 of FIG. 3, but radially extended shoulders of the lug 66 help the pawl 70 smoothly ride outward from the notch in lug 66 and back in after completion of a rotation independent of the pawl 70.

The main portion 114 of each pawl 70,72 is contiguous with the head 110 and tail 112 and has the shape of an arcuate band. The heads 110 of the pawls 70,72 are continuously resiliently biased against respective ratchets 62,64. It is preferred that the main portions 114 of the pawls 70,72 also be continuously resiliently biased against respective ratchets 62,64. This biasing can be provided by use of prestressed pawls 70,72 that have a flat or roughly flat main portion 114 when unstressed. The continuous resilient biasing causes frictional loading between the main portion 114 of each pawl 70,72 and between-ratchet portions 120 the respective ratchet 62,64. This loading makes the motions of the winders 34,36 feel more precise to the user and reduces start-up stresses on mechanisms connected to the output unit 32. The pawls 70,72, preferably, each curve in a plane perpendicular to the axis 30 through an arc of 180 degrees or more; since pawls 70,72 of this arc hold themselves in place against the ratchets 62,64.

The material of the pawls 70,72 is not critical but must have sufficient resilience to bias the pawls 70,72 as previously described. The pawls 70,72 can each be a ribbon of spring steel in which the body 12 has a substantially flat configuration when relaxed. The pawls 70,72 can also be made of suitably resilient plastic or other material.

The pawls 70,72 and their races 74,76 can share a common plane perpendicular to the axis of rotation or the inner pawl 70,72 and race 74,76 can be axially offset, either recessed or raised, relative to the other pawl 70,72. The axially dimensions of the components of the film winder unit 28 can be minimized, within the limits of the strengths of the materials used and the desired dimensions of grip portions of the winders 34,36.

The film winder unit 28 can be positioned in a variety of locations on the body 12. The axis of rotation 30 can be collinear or noncollinear with one of the film space axes 24. The axis of rotation 30 can be parallel to an imaginary plane defined by the film space axes 24 or can be moved toward the front or back of the camera such that the axis of rotation 30 is offset from the imaginary plane defined by the film space axes 24 or can be tilted relative to the film space axes 24. For example, the axis of rotation 30 can be substantially perpendicular to the film space axes 24.

The components of the film winder unit 28 are held in place in an axial direction by any convenient means, such as a fastener 122, or part of the body 12 and sandwiched components of the film winder unit 28 are held in position by overlapping parts. The fastener 122 shown in FIG. 1 has a cap 124 that bears on the inner winder 36 and a bottom 126 that is attached to the body 12. The cap 124 and bottom 126 are joined together with the components of the film winder unit 28 in between.

The film winder unit 28 is used by turning one of the winding members 102,104. For example, if the outer winding member 102 is turned in its coupled direction of rotation, the first face 106 of the lug 66 of the outer winding member 102 contacts the first face 116 of the tail 112 of the outer pawl 70 and pushes the outer pawl 70 against the drive member 78. The drive member 78 then rotates relative to the axis 30 as the outer winding member 102 is turned. The rotation of the drive member 78 drives an abutment 84 of the inner ratchet 64 against the tail 112 of the inner pawl 72, which then rotates with the drive member 78. The rotation of the inner pawl 72 drives the head 110 of the inner pawl 72 against the inner lug 68, causing the inner winding member 104 to rotate with the drive member 78.

If the operator turns the outer winding member 102 in its uncoupled direction of rotation, the second face 108 of the lug 66 of the outer winding member 102 contacts the second face 116 of the tail 112 of the outer pawl 70 and pushes the outer pawl 70 along the outer race 74. The head 110 of the pawl 70 is pulled out of an engagement port 80 of the outer ratchet 62, and travels along a between-engagement portion 120 of the ratchet 62. The head 110 then "clicks" into the next engagement port 80. The drive member 78 and inner winding member 104 are not rotated. This continues as rotation of the outer winder 34 in its uncoupled direction of rotation is continued. If desired, materials can be chosen to make the clicking audible to provide an indication to the operator that the winder has been turned in an inappropriate direction.

Rotation of the inner winding member 104 operates the film winder unit 28 in the same manner as the rotation of the outer winding member 102, except that the coupled and uncoupled directions of rotation for the inner winding member 104 are opposite those of the outer winding member 102.

The film winder unit 28 is easy to learn to use and clicks during operation or is silent, that is, neither pawl 70,72 clicks; as the operator chooses. The clicking noise has a comparable meaning for the operator as with a ratchet wrench or other single ratchet and pawl mechanism. The film winder unit 28 is silent when transferring power, that is, when a winder 34 or 36 is turned by the user and the drive member 78 is rotating. The film winder unit 28 clicks when a winder 34 or 36 is rotated and power is not being transferred to the drive member 78. For example, when the operator rotates the outer winding member 102 in its coupled direction of rotation, the drive member 78 rotates and the inner winding member 104 is driven in its uncoupled direction of rotation. Both winding members 102,104 move silently, that is, neither pawl 70,72 clicks, unless the operator chooses to use a ratcheting motion to rotate the outer winding member 102 or the operator ineffectively tries to push the inner winding member 104 along at a rate of rotation greater than rate the inner winding member 104 is being driven by the rotation of outer winding member 102.

The invention has been described in detail with particular reference to certain preferred embodiments thereof, but it will be understood that variations and modifications can be effected within the spirit and scope of the invention.

PARTS LIST apparatus 10
body 12
chambers 14,16
film spaces 18,20
intermediate frame 22
gear train 23
film space axis 24.
spindle 25
film transport 26
spool 27
film winder unit 28
cartridge 29
axis 30
spool 31
output unit 32
engagement element 33
outer winder 34
inner winder 36
outer clutch 38
inner clutch 40
gear teeth 41
arrows 42,44
bases 46,48
grip portions 50,52
dashed line 54
contact surfaces 56,58,60
outer and inner ratchets 62,64
outer and inner lugs 66,68
outer and inner pawls 70,72
outer and inner races 74,76
drive member 78
engagement port 80
ramp 82
abutment 84
outer boundary surface 86
inner boundary surface 88
outer raceway surface 90
inner raceway surface 92
Cover surfaces 94,96
circumferential surfaces 98,99
circumferential surfaces 100,101
outer and inner winding members 102,104
first and second faces 106,108
head 110
tail 112
main portion 114
first and second faces 116,118
between-ratchet portions 120
fastener 122
cap 124
bottom 126

What is claimed is:

1. An apparatus for winding film, comprising:
    a film transport adapted to move the film in two opposed directions in response to rotational inputs in forward and reverse directions;
    an output unit mechanically engaging said film transport for rotational movement in said forward and reverse directions, said output unit defining an axis of rotation;
    an outer winder coaxial with said output unit, said outer winder being rotatable about said axis in said first and second directions of rotation relative to said body;
    a inner winder nested in said outer winder, said inner winder being coaxial with said output unit, said inner winder being rotatable about said axis in said first and second directions of rotation relative to said body independent of said outer winder; and
    outer and inner clutches disposed between respective said winders and said output unit, said outer clutch coupling said outer winder to said output unit during rotation of said outer winder relative to said body in said first direction of rotation, said outer clutch decoupling said outer winder from said output unit during rotation of said outer winder relative to said body in said second direction of rotation, said inner clutch coupling said inner winder to said output unit during rotation of said inner winder relative to said body in said second direction of rotation, said inner clutch decoupling said inner winder from said output unit during rotation of said inner winder relative to said body in said first direction of rotation.

2. The apparatus of claim 1 wherein each said clutch has a trapped, loose pawl.

3. The apparatus of claim 1 wherein said clutches each further comprise a ratchet, a lug, and a loose pawl, said ratchets each being fixed to said output unit, each of said ratchets and a respective said winder defining a race, said lugs each being disposed in a respective said race and being fixed to a respective said winder, said pawls each being trapped in a respective said race, said pawls each having a head biased toward a respective said ratchet and a tail disposed to engage a respective said lug.

4. The apparatus of claim 3 wherein said pawls each have a main portion between a respective said head and said tail, said main portion being continuously resiliently biased against a respective said ratchet.

5. A camera for use with photographic film, said camera comprising:
    a body enclosing a film path;
    a film transport disposed in said body in operative relation to said film path;
    an output unit engaging said film transport, said output unit being rotatable in opposed first and second directions of rotation relative to said body about an axis of rotation;
    an outer winder coaxial with said output unit, said outer winder being rotatable about said axis in said first and second directions of rotation relative to said body;
    a inner winder nested in said outer winder, said inner winder being coaxial with said output unit, said inner winder being rotatable about said axis in said first and second directions of rotation relative to said body independent of said outer winder; and outer and inner clutches disposed between respective said winders and said output unit, said outer clutch coupling said outer winder to said output unit during rotation of said outer winder relative to said body in said first direction of rotation, said outer clutch decoupling said outer winder from said output unit during rotation of said outer winder relative to said body in said second direction of rotation, said inner clutch coupling said inner winder to said output unit during rotation of said inner winder relative to said body in said second direction of rotation, said inner clutch decoupling said inner winder from said output unit during rotation of said inner winder relative to said body in said first direction of rotation.

6. The camera of claim 5 wherein each said clutch has a trapped, loose pawl.

7. The camera of claim 6 wherein said camera further comprises outer and inner ratchets fixed to said output unit, and wherein said pawls each have a main portion between a respective said head and said tail, said main portion being continuously resiliently biased against a respective said ratchet.

8. The camera of claim 5 wherein said pawls are bent resilient bands.

9. The camera of claim 5 wherein said clutches each further comprise a ratchet, a lug, and a loose pawl, said ratchets each being fixed to said output unit, each of said ratchets and a respective said winder defining a race, said lugs each being disposed in a respective said race and being fixed to a respective said winder, said pawls each being trapped in a respective said race, said pawls each having a head biased toward said drive member and a tail disposed to engage a respective said lug.

10. The camera of claim 9 wherein said pawls each have a main portion between a respective said head and said tail, said main portion being continuously resiliently biased against a respective said ratchet.

11. The camera of claim 5 wherein said output unit and said winders are aligned along said axis such that at least one geometric plane perpendicular to said axis extends through said output unit, said outer winder, and said inner winder.

12. The camera of claim 11 wherein said inner clutch is axially offset from said outer clutch.

13. The camera of claim 5 wherein said output unit directly supports said inner winder and said outer winders.

14. The camera of claim 5 wherein said inner winder has a handle and a base, said handle being pivotable relative to said base between a use position wherein said handle extends outward from said base and a stored position wherein said handle is at least partially recessed within said base.

15. A camera for use with photographic film, said camera comprising:

a body enclosing a film path;

a film transport disposed in said body in operative relation to said film path;

a drive member rotatable in opposed first and second directions of rotation relative to said body about an axis of rotation, said drive member having an output unit engaging said film transport, said drive member having an annular inner ratchet and an annular outer ratchet fixed to said output unit;

an outer winder coaxial with said drive member, said outer winder being rotatable about said axis in said first and second directions of rotation relative to said body;

an inner winder coaxial with said drive member, said inner winder being rotatable about said axis in said first and second directions of rotation relative to said body independent of said outer winder; and an outer pawl driving said outer ratchet when said outer winder is rotated in said first direction, said outer pawl rotating relative to said outer ratchet when said outer winder is rotated in said second direction;

an inner pawl driving said inner ratchet when said inner winder is rotated in said second direction, said inner pawl rotating relative to said inner ratchet when said inner winder is rotated in said first direction.

16. The camera of claim 15 wherein said pawls are continuously resiliently biased against respective said ratchets.

17. The camera of claim 16 wherein said pawls are each trapped between said drive member and a respective said winder, and wherein said camera further comprises a pair of lugs, said lugs each being fixed to a respective said winder adjoining a respective said ratchet, said lugs each being disposed to engage a respective said pawl.

18. The camera of claim 17 wherein said pawls each have a head, a tail, and a main portion between said head and tail, said head and said main portion being continuously resiliently biased against said drive member, said tail being disposed for engagement by a respective said lug.

19. The camera of claim 18 wherein said inner winder is nested in said drive member and said outer winder.

20. The camera of claim 15 wherein said pawls are each trapped between said drive member and a respective said winder, and wherein said camera further comprises a pair of lugs, said lugs each being fixed to a respective said winder adjoining a respective said ratchet, said lugs each being disposed to engage a respective said pawl.

21. The camera of claim 15 wherein said pawls each have a head, a tail, and a main portion between said head and tail, said head and said main portion being continuously resiliently biased against said drive member, said tail being disposed for engagement by a respective said lug.

22. The camera of claim 15 wherein said film path includes a pair of roughly cylindrical film spaces, each said space defining a film axis, and said axis of rotation is noncollinear with said film space axes.

23. The camera of claim 22 wherein said axis of rotation is parallel to an imaginary plane defined by said film space axes.

24. The camera of claim 23 wherein said axis of rotation of said winding elements is offset from said imaginary plane defined by said film space axes.

25. The camera of claim 22 wherein said axis of rotation is substantially perpendicular to said film space axes.

* * * * *